United States Patent
Joyce et al.

(10) Patent No.: US 9,527,489 B2
(45) Date of Patent: Dec. 27, 2016

(54) FAILURE TOLERANT VEHICLE SPEED

(71) Applicant: Ford Global Technologies, LLC, Dearborn, MI (US)

(72) Inventors: John P. Joyce, West Bloomfield, MI (US); Scott J. Lauffer, Northville, MI (US); Peter Francis Worrel, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/201,671

(22) Filed: Jul. 5, 2016

(65) Prior Publication Data

US 2016/0311419 A1    Oct. 27, 2016

Related U.S. Application Data

(62) Division of application No. 14/664,052, filed on Mar. 20, 2015.

(60) Provisional application No. 62/023,475, filed on Jul. 11, 2014.

(51) Int. Cl.

| | |
|---|---|
| *G01C 22/00* | (2006.01) |
| *B60T 8/96* | (2006.01) |
| *G05D 1/00* | (2006.01) |
| *G05D 1/02* | (2006.01) |
| *B60T 7/12* | (2006.01) |
| *B60T 8/88* | (2006.01) |

(52) U.S. Cl.
CPC .. *B60T 8/96* (2013.01); *B60T 7/12* (2013.01); *B60T 8/88* (2013.01); *G05D 1/0077* (2013.01); *G05D 1/0088* (2013.01); *G05D 1/021* (2013.01); *B60T 2250/00* (2013.01); *B60T 2270/40* (2013.01)

(58) Field of Classification Search
CPC combination set(s) only.
See application file for complete search history.

(56) References Cited

U.S. PATENT DOCUMENTS

| | | |
|---|---|---|
| 4,345,796 A | 8/1982 | Reinecke |
| 4,701,854 A | 10/1987 | Matsuda |
| 4,722,576 A | 2/1988 | Matsuda |
| 5,588,719 A | 12/1996 | Bailleux |

(Continued)

FOREIGN PATENT DOCUMENTS

| | | |
|---|---|---|
| EP | 2719593 | 4/2014 |
| GB | 2119043 A | 11/1983 |
| GB | 2448007 A | 10/2008 |

OTHER PUBLICATIONS

GB UKIPO Search Report dated Jan. 22, 2016, GB1511670.0 from U.S. Appl. No. 14/664,052, filed Mar. 20, 2015.
GB Search Report dated Apr. 27, 2016 (3 pages).

*Primary Examiner* — Hussein A. Elchanti
(74) *Attorney, Agent, or Firm* — Frank MacKenzie; Bejin Bieneman PLC

(57) ABSTRACT

An autonomous vehicle control sub-system includes first and second brake control modules that are communicatively and electrically connected to one another and a plurality of wheel-speed sensors communicatively connected to the first brake control module. The first module is programmed to receive wheel-speed data from the wheel-speed sensors. The second module is programmed to process the wheel-speed data in the event of a failure in the first module.

16 Claims, 3 Drawing Sheets

(56) References Cited

U.S. PATENT DOCUMENTS

| | | | |
|---|---|---|---|
| 7,406,370 B2 * | 7/2008 | Kojori | G05B 9/03 |
| | | | 180/65.8 |
| 2004/0183364 A1 | 9/2004 | Marsh et al. | |
| 2005/0189814 A1 | 9/2005 | Mallevais et al. | |
| 2006/0232124 A1 | 10/2006 | Friederich et al. | |
| 2007/0170774 A1 * | 7/2007 | Gerum | B60T 13/66 |
| | | | 188/140 R |
| 2008/0197696 A1 | 8/2008 | Degoul et al. | |
| 2010/0243388 A1 | 9/2010 | Holzwarth | |
| 2013/0184957 A1 | 7/2013 | Herges et al. | |

\* cited by examiner

FAILURE TOLERANT VEHICLE SPEED

CROSS-REFERENCE TO RELATED APPLICATIONS

This application claims priority to U.S. Provisional Patent Application No. 62/023,475, titled "FAILURE TOLERANT VEHICLE SPEED SENSOR SYSTEM AND METHOD" and filed on Jul. 11, 2014, the contents of which are hereby incorporated by reference in its entirety. This application is a divisional of U.S. application Ser. No. 14/664,052, titled "FAILURE TOLERANT VEHICLE SPEED", filed on Mar. 20, 2015, which is hereby incorporated by reference in its entirety.

BACKGROUND

Redundant elements and/or connections between elements and/or components can be difficult to provide in a vehicle, but can be important, particularly where such elements, connections, components, etc., are used for vehicle operations performed without human intervention, sometimes referred to as "autonomous" operations. For example, with respect to wheel-speed sensors, not only are the sensors difficult to package in knuckles and bearings, but even cables and wires that are carefully routed to articulating wheel-ends can fail due to repeated bending and flexing.

DETAILED DESCRIPTION

There is a need for systems and methods that address possible failures in wheel-speed sensors, e.g., for autonomous or semi-autonomous vehicles. An example autonomous vehicle control system that addresses such issues includes first and second brake control modules that are communicatively and electrically connected to one another and a plurality of wheel-speed sensors communicatively connected to the first brake control module. The first module is programmed to receive wheel-speed data from the wheel-speed sensors. The second module is programmed to process the wheel-speed data in the event of a failure in the first module.

The elements shown may take many different forms and include multiple and/or alternate components and facilities. The example components illustrated are not intended to be limiting. Indeed, additional or alternative components and/or implementations may be used.

Figure 1:
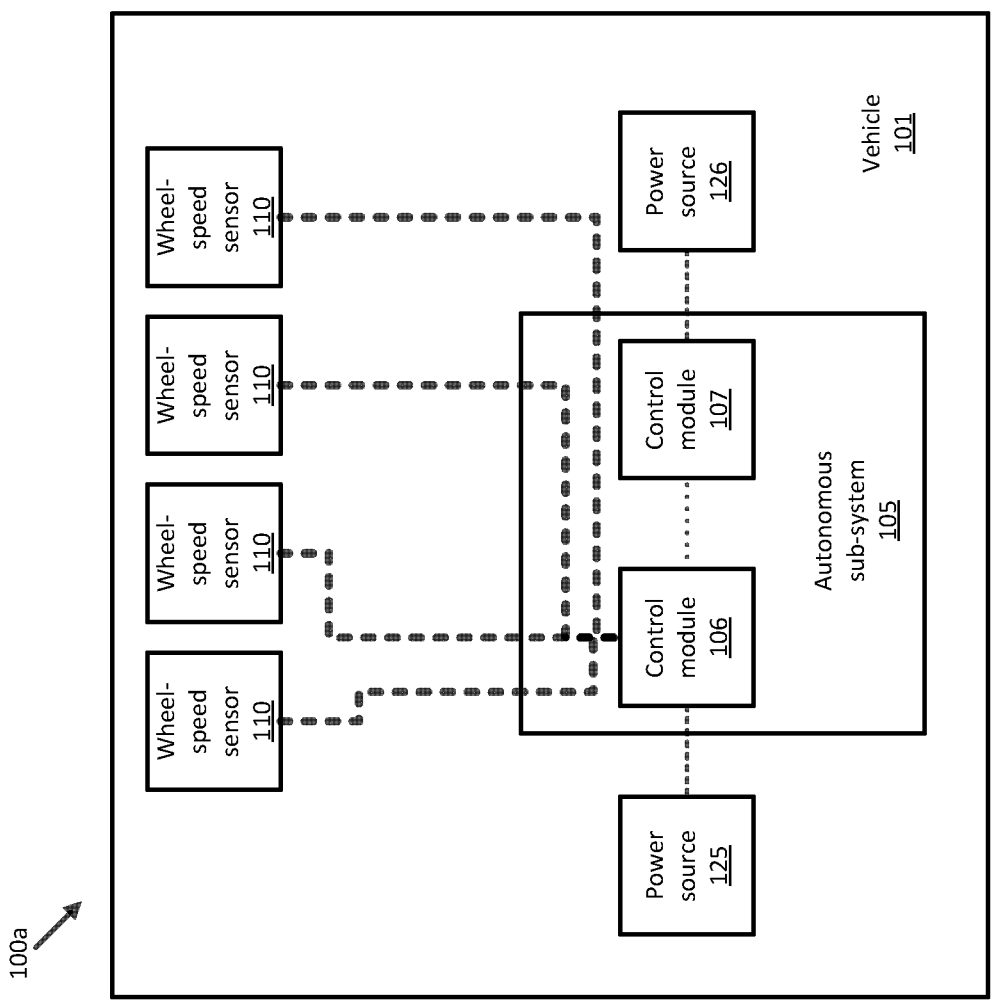
FIG. 1 is a block diagram of an example of a vehicle speed sensor system.

FIG. 1 is a block diagram of an example of a vehicle speed sensor system 100a. An autonomous sub-system 105 in a vehicle 101 includes first and second brake control modules 106, 107. In general, the autonomous sub-system 105 can comprise a combination of software and hardware for performing various operations, such as receiving and processing sensor data, receiving and processing data from various vehicle 101 components, and for providing information and instructions to various vehicle 101 components to support various autonomous actions, i.e., vehicle 101 operations performed without intervention or controlled by a human operator. For example, the modules 106, 107 generally each include a processor and a memory, the memory including one or more forms of computer-readable media, and storing instructions executable by the processor for performing various operations, including as disclosed herein.

The modules 106, 107 generally include programming to control vehicle 101 brakes, e.g., to send a signal to actuate one or more brakes (not shown) of the vehicle 101. Further, the brake control module 106, sometimes referred to as the "primary" module 106, is communicatively coupled to a plurality of wheel-speed sensors 110. For example, various components discussed herein, including the modules 106, 107, as well as the sensors 110, may be programmed for communications on, and connected to, one or more controller area network (CAN) buses or the like, and/or may use other communications mechanisms and/or protocols.

The module 106 is further also electrically and communicatively connected to the brake control module 107, sometimes referred to as the "secondary" module 107. As such, the secondary module 107 can provide at least a limited amount of power to the module 106. Accordingly, in the event of a power loss failure affecting an ability of the primary module 106 to receive and/or process signals from the wheel-speed sensors 110, the secondary module 107 can provide power to the primary device 106. For example, as shown in FIG. 1, the sub-system 105 may be connected to at least two power sources 125, 126, and in particular, a first power source 125 may be connected to the control module 106, and a second power source 126 may be connected to the control module 107.

Thus, upon a failure of the first power source 125 causing a failure of the primary module 106, whereby the primary module 106 is unable or has an impaired ability to power and process signals to and from the sensors 110, the primary module 106 can draw power from the secondary module 107 which in turn is receiving power from the second power source 126. In this scenario, the primary device 106 can distribute power obtained from the secondary module 107 to power the sensors 110. The primary device 106 can further provide information relating to wheel-speeds obtained from one or more of the sensors 110 to the secondary module 107. The secondary module 107 can then use the wheel-speed information to provide instructions to vehicle 101 brake actuators.

The system 100a may be implemented in a variety of ways. For example, in one possible approach, the limited power that the primary module 106 draws from the secondary module 107 may be used to power the wheel-speed sensors 110, as well as receive wheel-speed data from the sensors 110, determine wheel-speeds therefrom, and communicate the wheel-speeds to the secondary module 107 via a connection such as a wired connection as is known for providing power, sensor data, etc.

In another implementation, the limited power that the primary module 106 draws from the secondary module 107 is used to power the wheel-speed sensors 110, and also to provide data from the wheel-speed sensors 110 to the secondary module 107 via modulated electrical signals provided on a dedicated electrical connection between the modules 106, 107. The secondary module 107 may then include programming to calculate wheel-speeds based on information received via the modulated electrical signals. In yet a further variation of either of the foregoing embodiments, another sub-system in the vehicle 101, e.g., a powertrain controller or the like (not shown) may be used to calculate an average speed of wheels being driven by the vehicle 101 powertrain, which average speed may be communicated to the secondary module 107, e.g., via a wired connection such as discussed above.

Figure 2:
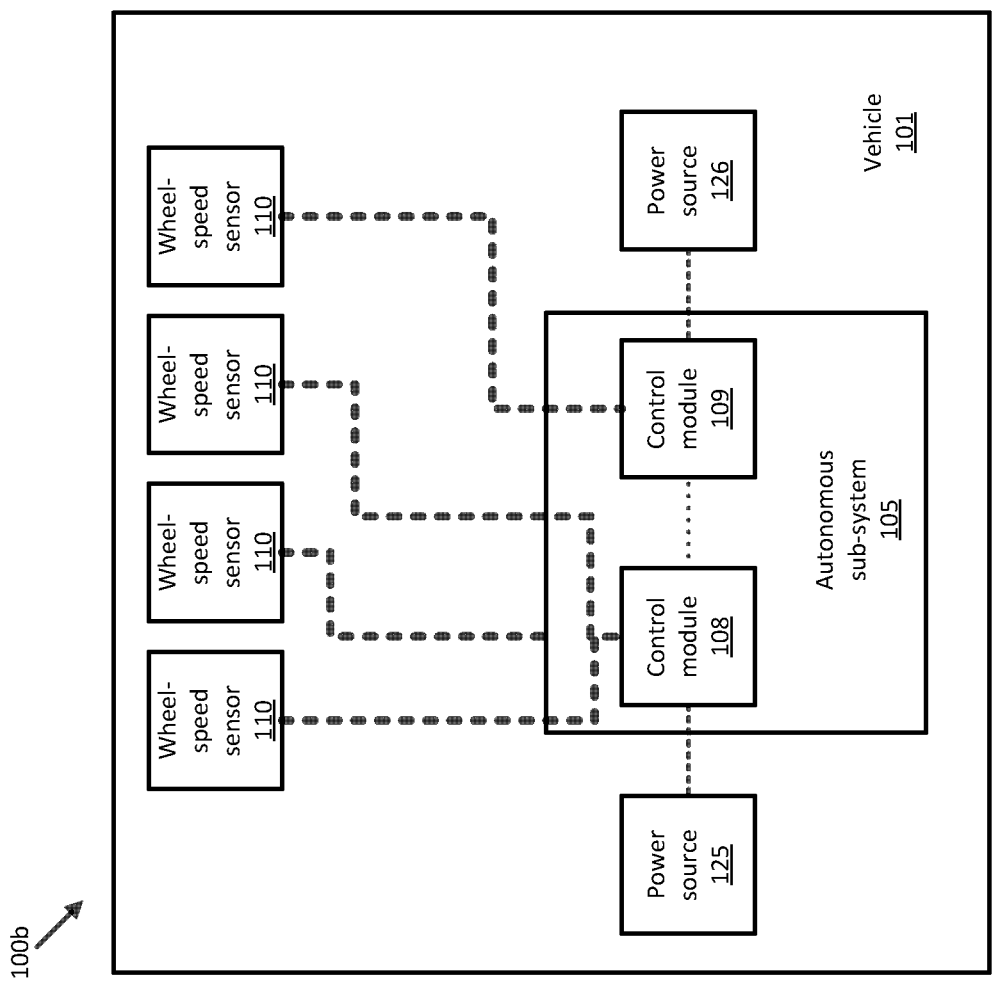
FIG. 2 is a block diagram of another example of a vehicle speed sensor system.

FIG. 2 is a block diagram of another example of a vehicle 101 speed sensor system 100*b*. The system 100*b* includes an autonomous sub-system 105 that includes brake control modules 108, 109, which are programmed to provide signals to actuate vehicle 101 brakes in a manner similar to that discussed above with respect to the modules 106, 107. Each of the modules 108, 109 is communicatively coupled, e.g., via a wired connection or the like, to at least one, but not all, of the wheel-speed sensors 110 in the vehicle 101. The example in FIG. 2 shows one possible scheme for connecting sensors 110 to modules 108, 109.

During typical operation of the vehicle 101 and the autonomous sub-system 105, the modules 108, 109 communicate with one another to provide wheel-speed data from various sensors 110, whereby each of the modules 108, 109 can perform operations for controlling vehicle 101 brakes. However, if one of the modules 108, 109 experiences a failure, e.g., a power loss, then the other module 108, 109 will have at least some wheel-speed data, i.e., wheel-speed data from at least one wheel-speed sensor 110. A determination of specific wheel-speed sensors 110 associated with specific vehicle 101 wheels that should be connected to a particular logic device will depend upon the availability of other sensors 110, the control authority and processing capability of each module 108, 109, and/or possibly other factors. Further, because wheel-speed information might be delayed in being processed by a first module 108 and provided to a second module 109, other processing in the vehicle 101 could need to be modified, such as anti-lock control processing in a brake control module 108, 109.

The system 100*b*, and also the system 100*a*, may be varied to meet requirements for failure/fault handling of a particular environment or particular conditions. For example, if a vehicle 101 performs automated autonomous operations only under certain "good" conditions, e.g., daylight, dry weather, etc., then reduced wheel-speed data and/or reduced processing capability of a secondary brake control module 107 or 109 may be acceptable. Likewise, if a brake controller can be configured to provide an acceptable rate of deceleration without causing wheel-lock, then wheel-speed sensors 110 may not be needed for brake control under normal conditions. Moreover, an autonomous vehicle 101 may be provided with other sensors in addition to wheel-speed sensors 101 that would allow for brake control decisions.

Figure 3:
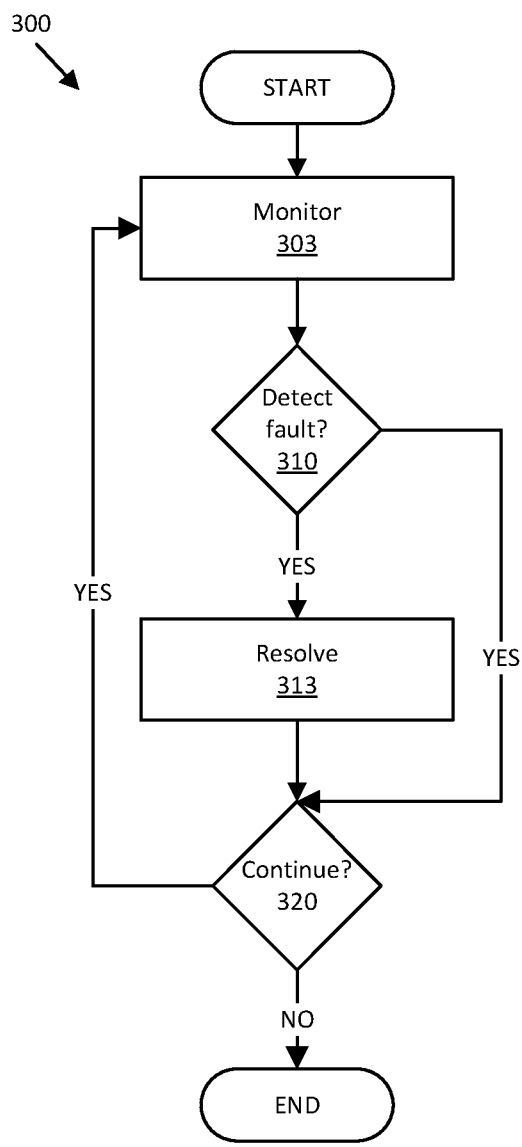
FIG. 3 illustrates an example of a process for responding to a fault condition in a brake control module.

FIG. 3 illustrates an example of a process 300 for responding to a fault condition in a brake control module 106, 107, 108, 109, etc. The process 300 begins in a block 305, in which the autonomous sub-system 105, e.g., via a module 106, 107, 108, 109, etc. as discussed above, monitors to determine whether a fault is detected.

In a block 310, following the block 305, if a fault is detected, the process 300 proceeds to a block 315. Otherwise, the process 300 proceeds to a block 320. For example, a fault or failure could be detected by a primary module 106 or 108 detecting a loss of power and/or communications from a primary module 107 or 109.

In the block 315, a detected fault is resolved, e.g., in a manner described above.

Following either of the blocks 310, 315, in a block 320, is determined whether the process 300 should continue. For example, if the process 300 may end when a vehicle 101 is powered off. In any event, if the process 300 is to continue, then control returns to the block 305. Otherwise, the process 300 ends.

Advantageously disclosed herein are systems and methods that provide robustness and failure handling for brake controllers with respect to a wide variety of potential failure causes with minimal modification of existing brake control components. For example and without limitation, the present systems and methods are vied robustness with respect to the following possible failure causes: power, microprocessors, signal conditioning, power regulation, crystal/oscillator failure, etc.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising an autonomous vehicle control sub-system, comprising:
   first and second brake control modules that are communicatively and electrically connected to one another;
   a plurality of wheel-speed sensors communicatively connected to the first brake control module;
   wherein the first module is programmed to receive wheel-speed data from the wheel-speed sensors, and the second module is programmed to process the wheel-speed data in the event of a failure in the first module; and
   wherein the first module is electrically connected to the second module, the second module is configured to supply power to the first module in the event of a power failure with respect to the first module.

2. The system of claim 1, wherein the first module and the second module are each programmed to provide a signal, based at least in part on the wheel-speed data, to a brake actuator in the vehicle.

3. The system of claim 1, wherein, upon detecting a failure, the first module is programmed to use the wheel-speed data to calculate at least one wheel-speed, and provide the at least one wheel-speed to the second module.

4. The system of claim 1, wherein, upon detecting a failure, the first module is programmed to provide the wheel-speed data to the second module via modulated electrical signals, and the second module is programmed to calculate wheel-speeds based on the modulated electrical signals.

5. The system of claim 1, wherein, upon detecting a failure, the first module is programmed to receive wheel-speed data from fewer than all of the wheel-speed sensors.

6. The system of claim 1, further comprising a powertrain control module programmed to calculate an average speed of driven wheels and provide the average speed of the driven wheels to the second module.

7. The system of claim 6, wherein the average speed of the driven wheels is provided to the second module via a wired connection.

8. The system of claim 1, wherein the first module is programmed to provide electrical power to the plurality of wheel speed sensors.

9. The system of claim 8, wherein the power from the second module is provided to the plurality of wheel speed sensors in the event of the power failure with respect to the first module.

10. A system, comprising an autonomous vehicle control sub-system, comprising:
    first and second brake controllers that are communicatively and electrically connected to one another;
    a plurality of wheel-speed sensors communicatively connected to the first brake controller;
    wherein the first brake controller is programmed to receive wheel-speed data from the wheel-speed sensors, and the second brake controller is programmed to process the wheel-speed data in the event of a failure in the first brake controller,
    wherein the first brake controller and the second brake controller are each programmed to provide a signal, based at least in part on the wheel-speed data, to a brake actuator in the vehicle, and
    wherein, upon detecting a failure, the first brake controller is programmed to use the wheel-speed data to calculate at least one wheel-speed, and provide the at least one wheel-speed to the second brake controller; and
    wherein the first module is electrically connected to the second module, the second module is configured to supply power to the first module in the event of a power failure with respect to the first module.

11. The system of claim 10, wherein, upon detecting a failure, the first brake controller is programmed to provide the wheel-speed data to the second brake controller via modulated electrical signals, and the second brake controller is programmed to calculate wheel-speeds based on the modulated electrical signals.

12. The system of claim 10, wherein, upon detecting a failure, the first brake controller is programmed to receive wheel-speed data from fewer than all of the wheel-speed sensors.

13. The system of claim 10, further comprising a powertrain controller programmed to calculate an average speed of driven wheels and provide the average speed of the driven wheels to the second brake controller.

14. The system of claim 13, wherein the average speed of the driven wheels is provided to the second brake controller via a wired connection.

15. The system of claim 10, wherein the first brake controller is programmed to provide electrical power to the plurality of wheel speed sensors.

16. The system of claim 15, wherein the power from the second brake controller is provided to the plurality of wheel speed sensors in the event of the power failure with respect to the first brake controller.

* * * * *